(12) United States Patent
Conchi, Jr.

(10) Patent No.: US 9,574,683 B2
(45) Date of Patent: Feb. 21, 2017

(54) ZERO-MOMENT FITTING

(71) Applicant: The Boeing Company, Chicago, IL (US)

(72) Inventor: William R. Conchi, Jr., Shoreline, WA (US)

(73) Assignee: The Boeing Company, Chicago, IL (US)

( * ) Notice: Subject to any disclaimer, the term of this patent is extended or adjusted under 35 U.S.C. 154(b) by 594 days.

(21) Appl. No.: 13/688,807

(22) Filed: Nov. 29, 2012

(65) Prior Publication Data

US 2014/0144002 A1 May 29, 2014

(51) Int. Cl.

| | |
|---|---|
| *F16L 5/00* | (2006.01) |
| *B23P 11/00* | (2006.01) |
| *F16C 23/04* | (2006.01) |
| *F16L 27/02* | (2006.01) |
| *F16L 5/02* | (2006.01) |

(52) U.S. Cl.
CPC ............ *F16L 5/00* (2013.01); *B23P 11/00* (2013.01); *F16C 23/046* (2013.01); *F16L 5/025* (2013.01); *F16L 27/023* (2013.01); *Y10T 29/49636* (2015.01); *Y10T 29/49948* (2015.01)

(58) Field of Classification Search
CPC .......... F16L 5/00; F16L 27/023; F16C 23/046; B23P 11/00; Y10T 29/49636; Y10T 29/49948
See application file for complete search history.

(56) References Cited

U.S. PATENT DOCUMENTS

| | | |
|---|---|---|
| 2,329,529 A | 9/1943 | Gwinn et al. |
| 2,788,203 A | 4/1957 | McCallum |
| 3,018,078 A | 1/1962 | Holdren |
| 5,205,768 A | 4/1993 | Pollack |
| 5,934,423 A | 8/1999 | Kallenbach |
| 6,070,835 A | 6/2000 | Stillinger |
| 2005/0247346 A1 | 11/2005 | Pentz |

(Continued)

FOREIGN PATENT DOCUMENTS

| | | |
|---|---|---|
| CA | 2813917 | 5/2012 |
| CN | 2682261 | 3/2005 |
| WO | WO2005/059421 | 6/2005 |

OTHER PUBLICATIONS

Pipe Hangers, Supports, & Snubbers, Sanwa Tekki Corporation, Accessed Nov. 20, 2012 from <<http://www.tekki.co.jp/english/products/pipehangers_support_snubbers/index.html>>, 2 pp.

(Continued)

*Primary Examiner* — Ryan J Walters
(74) *Attorney, Agent, or Firm* — Baldauff IP, LLC; Michael J. Baldauff, Jr.

(57) ABSTRACT

Apparatus, systems, and methods provide for a zero-moment fitting for securing a fluid conduit to a structure. According to various embodiments, a fitting may include a spherical bearing and a bearing housing. The spherical bearing may include a conduit aperture for receiving a fluid conduit through the spherical bearing. The bearing housing may be configured to encompass and retain the spherical bearing within the bearing housing, allowing for rotation of the spherical bearing within the bearing housing. The bearing housing may be fixedly attached to the structure to secure the fitting to the structure.

8 Claims, 3 Drawing Sheets

(56) References Cited

U.S. PATENT DOCUMENTS

2011/0170815 A1\* 7/2011 Sandin .......................... 384/212

OTHER PUBLICATIONS

Canadian Office Action dated Oct. 20, 2015 from Canadian Application No. 2,831,513.
Chinese Office dated Sep. 2, 2016 from CN Application Serial No. 2013106296279; 12 pages.

\* cited by examiner

ZERO-MOMENT FITTING

BACKGROUND

Aircraft and other vehicles commonly have various fluid conduits (e.g., fuel lines, hydraulic lines, air lines, etc) extending throughout the vehicle. These conduits may traverse bulkheads and other structures as they route fluid between source and destination locations. The conduits are typically routed through openings in the bulkheads and secured to the bulkheads at these locations with fittings to prevent abrasion and other damage to the fluid conduits that could occur due to contact between the conduit and the bulkhead.

Fuel lines and other fluid conduits are often pressurized. As pressurized fluids travel through the conduits, the geometry or configuration of the lines and the various couplings associated with the fluid conduits creates various loads and moments that may be transferred to the bulkheads or to the fittings that attach the fluid conduits to the bulkheads. Pulse loads or shear loads that align with a central axis of the fluid conduit may not be problematic. However, loads that create a twisting of the fluid conduit around the central axis or at a non-zero angle with respect to the central axis provide a moment on the fitting and/or bulkhead. These moments may lead to fatigue or failure of the fitting over time.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus, systems, and methods provide for a zero-moment fitting, or a fitting that allows for the rotation of a fluid conduit around a central axis without applying an undesirable moment on the corresponding fitting and structure to which the fitting is attached. According to one aspect of the disclosure provided herein, a structural fitting may include a spherical bearing and a bearing housing. The spherical bearing may include a conduit aperture for receiving a fluid conduit through the spherical bearing. The bearing housing may be configured to retain the spherical bearing within the bearing housing, to allow for rotation of the spherical bearing within the bearing housing, and to be attached to a structure to secure the bearing housing and the spherical bearing to the structure.

According to another aspect, a method for securing a fluid conduit to a structure includes encompassing the fluid conduit with a spherical bearing. The spherical bearing is secured within a bearing housing, which is secured to the structure. In doing so, the spherical bearing is retaining within the housing while allowing for the rotation of the spherical bearing within the housing, eliminating any moments from being applied to the housing and corresponding structure.

According to yet another aspect, a system for securing a fluid conduit may include first and second portions of the fluid conduit, a spherical bearing that includes a front bearing and a rear bearing, and a bearing housing. The first and second portions of the fluid conduit each include a coupling flange with fastener apertures. The coupling flanges abut one another to couple the two portions of the fluid conduit with fasteners via the fastener apertures. The front and rear bearings each encompass corresponding first and second portions of the fluid conduit. The front and rear bearings abut against one another, encompassing the fluid conduit and securing the fasteners coupling the first and second portions of the fluid conduit via the coupling flanges. The assembled spherical bearing is positioned within the bearing housing, which may be coupled to the structure. The bearing housing retains the spherical bearing while allowing for rotation of the spherical bearing within the bearing housing.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to a zero-moment fitting, system, and methods for securing a fluid conduit to a structure. As discussed briefly above, fluid conduits are often routed through bulkheads and other structures. In doing so, fittings are typically used to secure the fluid conduit to the structure as the conduit passes through. However, as pressurized fluids travel through the fluid conduit, due to the geometry of some conventional fluid conduits and associated couplings, a load or moment may be created on the traditional fitting used to secure the fluid conduit to the structure. This undesirable moment may result in premature fatigue or failure of the fitting or fluid conduit at that location.

Utilizing the concepts described herein, a zero-moment fitting may be used to allow for rotational movement of the fluid conduit around a longitudinal axis of the conduit without imposing a corresponding load and moment on the fitting. As will be described in detail below, a fitting according to various embodiments may include a housing that is coupled to the structure. A spherical bearing encompasses the fluid conduit and rests within the housing without being fixedly attached to the housing. Any rotational movement of the fluid conduit creates a corresponding rotational movement of the spherical bearing. However, because the spherical bearing is allowed to rotate freely within the housing, there is no associated load or moment imposed on the fitting as a result of the rotational movement of the fluid conduit and spherical bearing.

Figure 1:
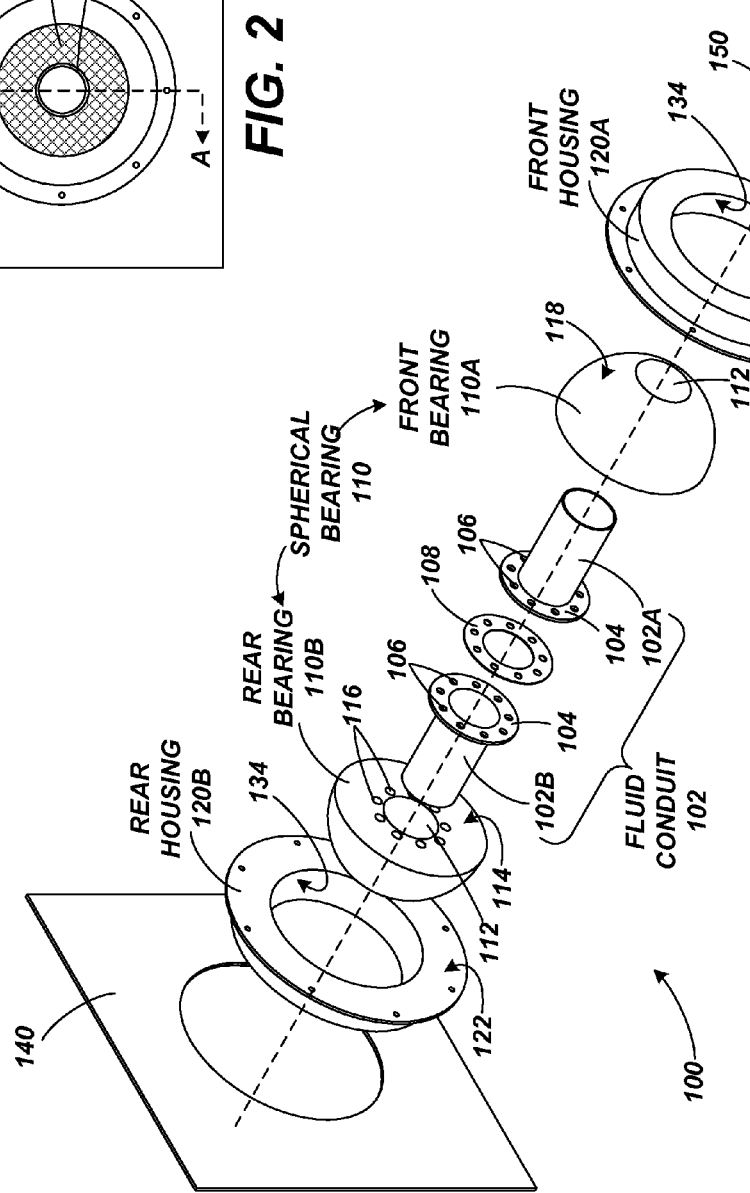
FIG. 1 is a top perspective exploded view of an example of a zero-moment fitting with a fluid conduit and the structure to which the fluid conduit is to be attached according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, the zero-moment fitting will be described. Turning to FIG. 1, an exploded view of an example of a zero-moment fitting 100 with a fluid conduit 102 and the structure 140 to which the fluid conduit 102 is to be attached are shown. The fluid conduit 102 may include a first portion 102A and a second portion 102B being joined together at or near the structure 140. According to one illustrative embodiment, the fluid conduit 102 may be a pressurized fuel line passing through the structure 140, which may be an aircraft bulkhead or wing spar.

The first portion 102A and the second portion 102B of the fluid conduit 102 may each include a coupling flange 104. Each coupling flange may have any number of fastener apertures 106 for receiving fasteners for coupling the two portions together. A coupling gasket 108 having corresponding apertures may be used between the coupling flanges 104 of the first portion 102A and the second portion 102B to prevent fluid leakage from the fluid conduit 102 when assembled.

A spherical bearing 110 may include two sections for ease of assembly, specifically a front bearing 110A and a rear bearing 110B. The front bearing 110A and the rear bearing 110B each include a bearing inner face 114 that will abut the corresponding opposing bearing inner face 114 to mate the front bearing 110A and the rear bearing 110B and create an assembled configuration of the spherical bearing 110. The exterior bearing surface 118 is shaped such that the spherical bearing 110 is approximately spherical when assembled. The material of the spherical bearing, and of the bearing housing 120 described below, may be any suitable material according to the operational loads for which the zero-moment fitting 100 will experience while minimizing weight and wear that may occur due to the friction between the spherical bearing 110 and the bearing housing 120. Example materials include but are not limited to CuNiSn or AlNiBr compounds or other suitable materials for the spherical bearing 110 and 15Cr-5Ni stainless steel or other suitable materials for the bearing housing 120.

The spherical bearing 110 additionally includes a conduit aperture 112 sized to receive the fluid conduit 102 within. The fluid conduit 102 passes through the approximate center of the spherical bearing 110 parallel with a longitudinal axis 150 extending through the zero-moment fitting 100. To secure the fluid conduit 102 within the spherical bearing 110, the front bearing 110A and/or the rear bearing 110B may include a number of fastener cavities 116 for receiving a front or rear portion of a fastener extending through the coupling flange 104 of the first or second portion of the fluid conduit 102. One or both of the front bearing 110A and the rear bearing 110B may additionally include a flange cavity (not shown in FIG. 1) configured to receive all or a portion of the coupling flange 104. In doing so, rotational movement of the fluid conduit 102 around the longitudinal axis 150, or angular rotation with respect to the longitudinal axis 150, will allow for the spherical bearing 110 to rotate with the fluid conduit 102 within the bearing housing 120.

The bearing housing 120 may include two sections for assembly purposes, specifically the front housing 120A and the rear housing 120B. These two sections may be identical components arranged to face one another such that an inside face 122 of the front housing 120A (not shown) will abut an inside face 122 of the rear housing 120B when assembled. Each of the front housing 120A and the rear housing 120B may have an inside face 122 and an outside face 128 opposite the inside face. The inside face may include an annular inner bearing edge 130, while the outside face may include an annular outer bearing edge 132. The surface defined between the annular inner bearing edge 130 and the annular outer bearing edge 132 may be referred to as the bearing retention surface 134, as this surface abuts the exterior bearing surface 118 and retains the spherical bearing 110 within the bearing housing 120.

According to various embodiments, the diameter of the annular outer bearing edge 132 may be smaller than the diameter of the annular inner bearing edge 130. According to one embodiment, the diameter of the annular inner bearing edge 130 may be approximately equivalent to, or slightly larger than, the diameter of the spherical bearing 110. In this manner, the front housing 120A and the rear housing 120B may be mated together with the spherical bearing 110 in between. The smaller diameters of the annular outer bearing edges 132 of the front and rear housings prevent the spherical bearing 110 from exiting either the front housing 120A or the rear housing 120B, effectively retaining the spherical bearing 110 within the zero-moment fitting 100.

As previously stated, the bearing retention surface 134 of the front housing 120A and of the rear housing 120B abut the exterior bearing surface 118 of the spherical bearing 110 when the zero-moment fitting 100 is in the assembled configuration. It should be appreciated that the bearing retention surface 134 between the annular inner bearing edge 130 and the annular outer bearing edge 132 of each of the front housing 120A and the rear housing 120B may be shaped such that the slope between the inner and the outer edge is linear or straight, or may be shaped such that the slope is arcuate or curved. An arcuate shape of the bearing retention surface 134 may substantially corresponds to the external shape of the spherical bearing 118.

The bearing housing 120 may additionally include a fitting flange 124 for securing the zero-moment fitting 100 to a structure 140. The fitting flange 124 may be configured as an annular flange as shown in FIG. 1, or may alternatively be configured as any number of tabs (not shown) extending from the inside face 122. The fitting flange 124 may include any number of fastener apertures 126 for receiving fasteners to secure the bearing housing 120 to the vehicle bulkhead or other structure 140. Moreover, the fitting flange 124 may have a recessed groove (not shown) for receiving an o-ring for preventing fluid from escaping through the structure 140 when the zero-moment fitting 100 is used in a wet environment such as within a tank of fluid.

Figure 2:
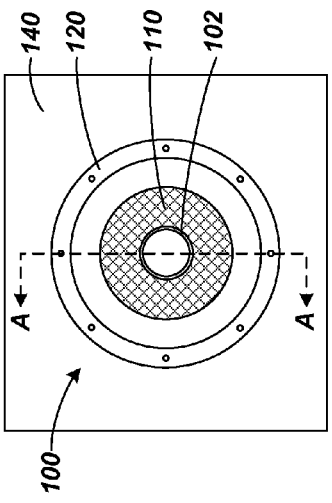
FIG. 2 is a front view of a zero-moment fitting securing a fluid conduit to a structure according to various embodiments presented herein.
Figure 3:
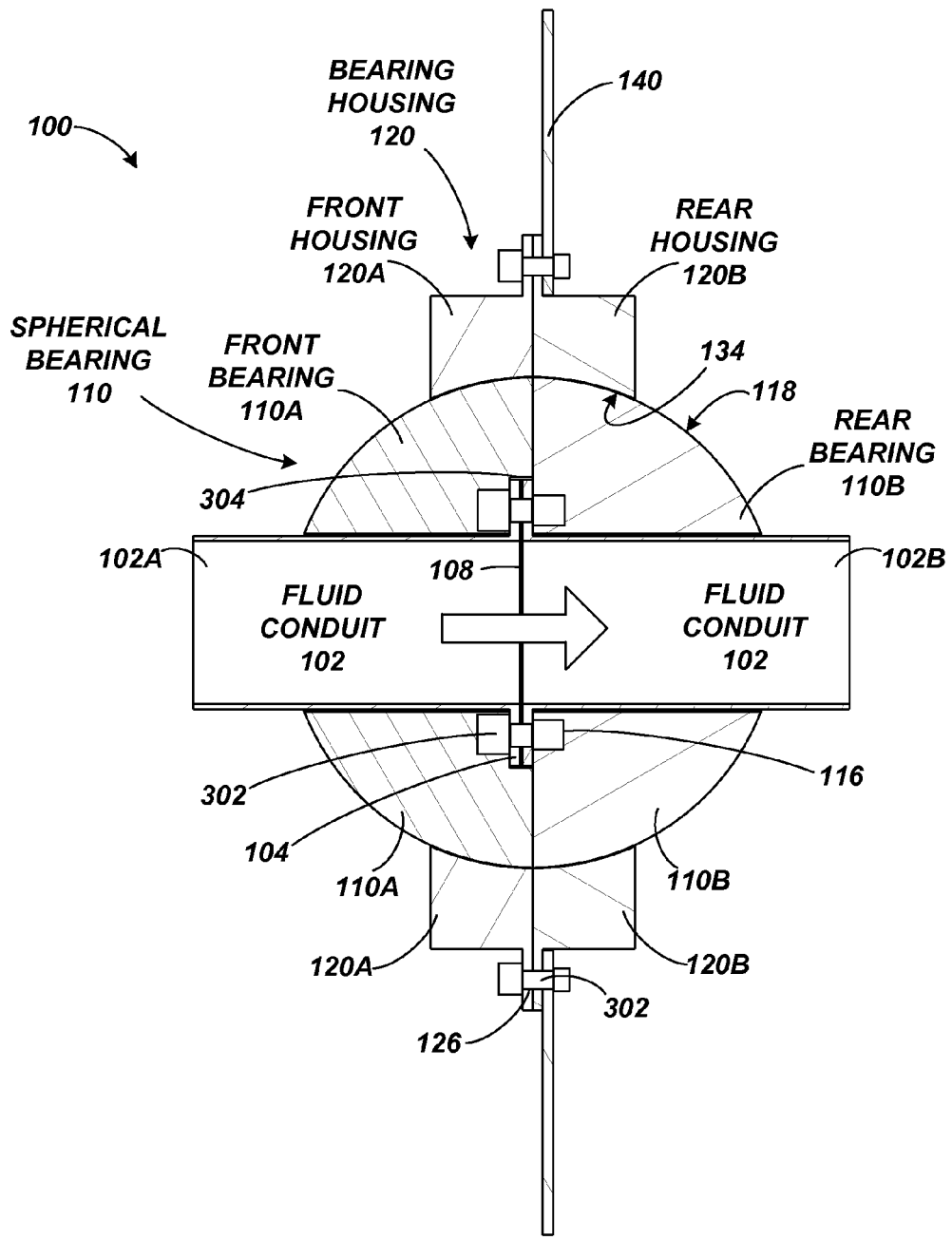
FIG. 3 is a cross-sectional view taken along line A-A of the zero-moment fitting of FIG. 2 according to various embodiments presented herein.

Turning now to FIGS. 2 and 3, a zero-moment fitting 100 in an assembled configuration and attached to a structure 140 will now be discussed. FIG. 2 shows a front view of the zero-moment fitting 100. The spherical bearing 110 has been hatched to distinguish the bearing from the bearing housing 120 for clarity purposes. From this view, the fluid conduit 102 can be seen traversing the center of the spherical bearing 110.

FIG. 3 shows a cross-sectional view of one embodiment of the zero-moment fitting 100 taken along line A-A of FIG. 2. As indicated by the open arrow, fluid flows through the fluid conduit 102 from one side of the structure 140 to the opposite side of the structure 140. The first portion 102A of the fluid conduit 102 is coupled to the second portion 102B via fasteners 302. The fasteners 302 may include any suitable conventional type of fastener. A bearing gasket 108 may be used between the coupling flanges 104 of the first portion 102A and the second portion 102B.

As discussed above, the front bearing 110A and the rear bearing 110B encompass the fluid conduit 102 and abut one another to create the spherical bearing 110. The front bearing 110A and the rear bearing 110B may include fastener cavities 116 for receiving a portion of the fasteners 302 that secure the two portions of the fluid conduit 102. One or both of the front bearing 110A and the rear bearing 110B may additionally include a flange cavity 304 for receiving the coupling flange 104 while allowing the bearing inner faces 114 of the front bearing 110A and rear bearing 110B to abut one another.

The bearing housing 120 is shown in FIG. 3 in the assembled configuration in which the front housing 120A is coupled to the rear housing 120B with the spherical bearing 110 retained within. As shown, the bearing housing 120 includes a bearing retention surface 134 that is shaped according to the exterior bearing surface 118. When the fluid conduit 102 moves and rotates in a manner that would traditionally create an undesirable load on the fitting secured to the structure 140, the spherical bearing 110 according to the disclosure herein is allowed to rotate within the bearing housing 120. In doing so, the bearing housing 120 remains free from rotational loads and corresponding moments that may damage or destroy a traditional fitting. The bearing housing 120 is fixedly attached to the structure 140 via the fitting flange 124 and corresponding fasteners 302.

Figure 4:
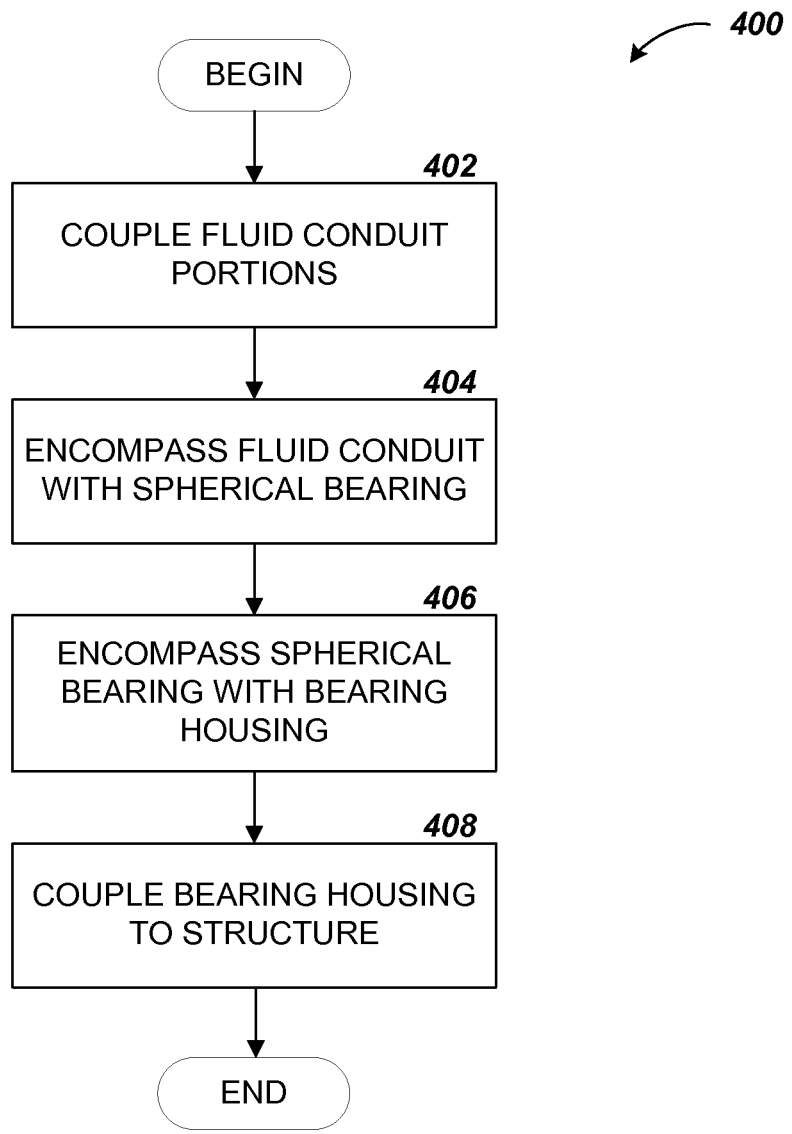
FIG. 4 is a process flow diagram illustrating a method for securing a fluid conduit to a structure according to various embodiments presented herein.

Turning now to FIG. 4, an illustrative routine 400 for securing a fluid conduit 102 to a structure 140 will now be described in detail. It should be appreciated that more or fewer operations may be performed than shown in the figures and described herein. These operations may also be performed in a different order than those described herein.

The routine 400 begins at operation 402, where the first portion 102A of the fluid conduit 102 is coupled to the second portion 102B via fasteners 302. The coupling may include sandwiching a bearing gasket 108 between coupling flanges 104 of the first portion 102A and the second portion 102A of the fluid conduit 102. Fasteners 302 may be threaded or otherwise positioned within fastener apertures 106 of the coupling flanges 104 and bearing gasket 108.

From operation 402, the routine 400 continues to operation 404, where the fluid conduit 102 is encompassed by the spherical bearing. To do so, the front bearing 110A is threaded onto the first portion 102A of the fluid conduit 102, while the rear bearing 110B is threaded onto the second portion 102B of the fluid conduit 102. The coupling flange 104 and corresponding fasteners 302 associated with the fluid conduit 102 may be positioned within the flange cavity 304 and fastener cavities 116 of one or both of the front bearing 110A and the rear bearing 110B. The bearing inner faces 114 of the front bearing 110A and the rear bearing 110B are positioned against one another to assemble the spherical bearing 110.

At operation 406, the front housing 120A is positioned on one side of the spherical bearing 110 with the fluid conduit 102 traversing through the housing and the rear housing 120B is similarly positioned on the opposing side of the spherical bearing 110. The front housing 120A and the rear housing 120B are moved inward until the inside faces 122 of the front housing 120A and the rear housing 120B abut one another with the spherical bearing 110 positioned within the bearing housing 120 against the bearing retention surface 134.

The routine 400 continues from operation 406 to operation 408, where the assembled housing is placed against the structure 140 and secured to the structure utilizing the fitting flange 124 of the bearing housing 120 and corresponding fasteners 302. After operation 408, the zero-moment fitting 100 is assembled and installed, securing the fluid conduit 102 to the structure 140 while allowing for rotational movement of the fluid conduit 102. The routine 400 ends.

Based on the foregoing, it should be appreciated that technologies for securing a fluid conduit to a structure in a manner that eliminates the undesirable moment on a traditional fitting created at least in part as a result of pressurized fluid travelling through various conduit geometries through a vehicle. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A structural fitting, comprising:
   a spherical bearing comprising a front bearing and a rear bearing,
   wherein the front bearing and the rear bearing each comprise a conduit aperture encircled by an exterior bearing surface and traversing from the exterior bearing surface through a bearing inner face such that abutting the bearing inner face of the front bearing against the bearing inner face of the rear bearing creates an assembled bearing configuration having a bearing conduit aperture defined by each conduit aperture of the front bearing and the rear bearing and configured to receive a fluid conduit traversing the spherical bearing, and
   wherein a longitudinal axis of the spherical bearing traverses through the bearing conduit aperture parallel with the fluid conduit and substantially normal to the bearing inner face of the front bearing and the bearing inner face of the rear bearing in the assembled bearing configuration; and
   a bearing housing configured to retain the spherical bearing within the bearing housing, to allow for rotation of the spherical bearing within the bearing housing, and to be fixedly coupled to a structure.

2. The structural fitting of claim 1, wherein the bearing housing comprises a front housing and a rear housing configured to abut one another to create an assembled housing configuration, the assembled housing configuration comprising an inside surface shaped to maintain the assembled bearing configuration of the spherical bearing while allowing rotation of the spherical bearing within the bearing housing.

3. The structural fitting of claim 2, wherein each of the front housing and the rear housing comprises:
   an inside face configured to mate with the inside face of a corresponding front housing or rear housing, the inside face comprising an annular inner bearing edge;
   an outside face opposite the inside face and external to the bearing housing in the assembled housing configuration, the outside face comprising an annular outer bearing edge having a smaller diameter than a diameter of the annular inner bearing edge; and
   a bearing retention surface defined between the annular inner bearing edge and the annular outer bearing edge.

4. The structural fitting of claim 3, wherein the bearing retention surface comprises an arcuate shape between the annular inner bearing edge and the annular outer bearing edge that substantially corresponds to an external shape of the spherical bearing.

5. The structural fitting of claim 1, wherein at least one of the front bearing and the rear bearing is configured to engage an assembled coupling flange coupling front and rear portions of the fluid conduit within the bearing conduit aperture such that the assembled bearing configuration secures the fluid conduit within the spherical bearing.

6. The structural fitting of claim 5, wherein the front bearing and the rear bearing comprise a plurality of fastener cavities, each of the fastener cavities configured for receiving a portion of a fastener from the assembled coupling flange coupling the front and rear portions of the fluid conduit.

7. The structural fitting of claim 1, wherein the bearing housing comprises a fitting flange comprising a fastener aperture configured to receive a fastener for coupling the bearing housing to the structure.

8. The structural fitting of claim 7, wherein the fluid conduit comprises a fluid line and wherein the structure comprises a bulkhead of a vehicle.

* * * * *